(12) United States Patent
Shi et al.

(10) Patent No.: US 12,344,273 B2
(45) Date of Patent: Jul. 1, 2025

(54) PEDESTRIAN CROSSING INTENT YIELDING

(71) Applicant: Waymo LLC, Mountain View, CA (US)

(72) Inventors: Xinwei Shi, Cupertino, CA (US); Junhua Mao, Palo Alto, CA (US); Khaled Refaat, Mountain View, CA (US); Tian Lan, Sunnyvale, CA (US); Jeonhyung Kang, San Jose, CA (US); Zhishuai Zhang, Baltimore, MD (US); Jonathan Chandler Stroud, Tempe, AR (US)

(73) Assignee: Waymo LLC, Mountain View, CA (US)

( * ) Notice: Subject to any disclaimer, the term of this patent is extended or adjusted under 35 U.S.C. 154(b) by 258 days.

(21) Appl. No.: 17/902,670

(22) Filed: Sep. 2, 2022

(65) Prior Publication Data

US 2023/0062158 A1 Mar. 2, 2023

Related U.S. Application Data

(60) Provisional application No. 63/240,195, filed on Sep. 2, 2021.

(51) Int. Cl.
*B60W 60/00* (2020.01)
*B60W 40/04* (2006.01)
(Continued)

(52) U.S. Cl.
CPC ........ *B60W 60/0011* (2020.02); *B60W 40/04* (2013.01); *B60W 50/0097* (2013.01);
(Continued)

(58) Field of Classification Search
CPC ............. B60W 60/0011; B60W 40/04; B60W 50/0097; B60W 60/0015;
(Continued)

(56) References Cited

U.S. PATENT DOCUMENTS 10,196,058 B2 2/2019 Paris et al.
10,496,091 B1 * 12/2019 Ross ..................... G06N 5/04
(Continued)

OTHER PUBLICATIONS

Chai et al., "MultiPath: Multiple Probabilistic Anchor Trajectory Hypotheses for Behavior Prediction," CoRR, Oct. 12, 2019, arXiv:2104. 05449, 14 pages.
(Continued)

*Primary Examiner* — Abby J Flynn
*Assistant Examiner* — Kyle J Kingsland
(74) *Attorney, Agent, or Firm* — Fish & Richardson P.C.

(57) ABSTRACT

Methods, systems, and apparatus, including computer programs encoded on a computer storage medium that determine yield behavior for an autonomous vehicle, and can include identifying an agent that is in a vicinity of an autonomous vehicle navigating through a scene at a current time point. Scene features can be obtained and can include features of (i) the agent and (ii) the autonomous vehicle. An input that can include the scene features can be processed using a first machine learning model that is configured to generate (i) a crossing intent prediction that includes a crossing intent score that represents a likelihood that the agent intends to cross a roadway in a future time window after the current time, and (ii) a crossing action prediction that includes a crossing action score that represents a likelihood that the agent will cross the roadway in the future time window after the current time.

21 Claims, 5 Drawing Sheets

(51) Int. Cl.
    *B60W 50/00*      (2006.01)
    *G06N 3/08*      (2023.01)

(52) U.S. Cl.
    CPC .. B60W 60/0015 (2020.02); B60W 60/00274 (2020.02); G06N 3/08 (2013.01); *B60W 2554/4029* (2020.02); *B60W 2554/4041* (2020.02); *B60W 2554/4045* (2020.02)

(58) Field of Classification Search
    CPC ... B60W 60/00274; B60W 2554/4029; B60W 2554/4041; B60W 2554/4045; B60W 30/09; G06N 3/08; G06N 3/0464
    See application file for complete search history.

(56) References Cited

U.S. PATENT DOCUMENTS

| | | | | |
|---|---|---|---|---|
| 2018/0329418 | A1* | 11/2018 | Baalke | G16Z 99/00 |
| 2019/0152490 | A1* | 5/2019 | Lan | G06V 20/58 |
| 2020/0168094 | A1* | 5/2020 | Shimodaira | G06N 20/00 |
| 2020/0279487 | A1 | 9/2020 | Toda et al. | |
| 2020/0307563 | A1 | 10/2020 | Ghafarianzadeh et al. | |
| 2021/0201052 | A1* | 7/2021 | Ranga | G06N 3/08 |
| 2022/0089152 | A1* | 3/2022 | Oh | B60W 60/0015 |
| 2022/0355815 | A1* | 11/2022 | Bill-Clark | G06V 40/103 |

OTHER PUBLICATIONS

Gao et al., "VectorNet: Encoding HD Maps and Agent Dynamics from Vectorized Representation," CoRR, May 8, 2020, arxiv.org/abs/2005.04259, 9 pages.

Szegedy et al., "Going Deeper with Convolutions," CoRR, Sep. 17, 2014, 12 pages.

Tolstaya et al., "Identifying Driver Interactions via Conditional Behavior Prediction," CoRR, Apr. 20, 2021, arXiv:2104.09959, 7 pages.

* cited by examiner

PEDESTRIAN CROSSING INTENT YIELDING

CROSS-REFERENCE TO RELATED APPLICATION

This application claims priority under 35 U.S.C. 119 to Provisional Application No. 63/240,195, filed Sep. 2, 2021, which is incorporated by reference.

TECHNICAL FIELD

This specification relates to autonomous and semi-autonomous vehicles.

Autonomous vehicles include self-driving cars, motorcycles, trucks, buses and similar vehicles. Autonomous vehicles use a variety of on-board sensors and computer systems to detect nearby objects and use such detections to make control and navigation decisions, while semi-autonomous vehicles can make control and navigation recommendations to a human driver.

SUMMARY

This specification describes a system implemented as computer programs on one or more computers in one or more locations that determines, for a future period of time, (i) a crossing intent prediction that represents a likelihood that an agent intends to cross a roadway, and (ii) a crossing action prediction that represents a likelihood that the agent will cross the roadway. A crossing intent prediction indicates that the agent intends to cross the roadway provided an opportunity arises (e.g., there is a break in traffic), while a crossing action prediction indicates that the user will cross the roadway. Autonomous vehicles can use these predictions when determining (for autonomous vehicles) or recommending (for semi-autonomous vehicles) future trajectories and speeds.

Particular embodiments of the subject matter described in this specification can be implemented so as to realize one or more of the following advantages. The techniques described below can be used to predict both an agent's intent and the agent's action. These predictions can allow an autonomous vehicle to consider both predictions when determining its trajectory, allowing the autonomous vehicle to yield when necessary to ensure safe operation, while not yielding unnecessarily, which could result in excess electricity or fuel usage. Further, the techniques described below create predictions about an agent's intent and action in a single pass, promoting efficient use of computing resources. In addition, the techniques described below can allow an autonomous vehicle to mimic the behavior of a human driver whose driving behavior has been determined to be courteous. The system can also produce scores reflecting additional agent behaviors such as loading or unloading vehicles, performing construction work, attending social gathering, etc., enabling the autonomous vehicle to better emulate the behavior of a human driver.

One aspect features identifying an agent that is in a vicinity of an autonomous vehicle navigating through a scene at a current time point. Scene features of the scene can be obtained and can include features of (i) the agent and (ii) the autonomous vehicle. An input that can include the scene features can be processed using a first machine learning model that is configured to generate (i) a crossing intent prediction that includes a crossing intent score that represents a likelihood that the agent intends to cross a roadway in a future time window after the current time point, and (ii) a crossing action prediction that includes a crossing action score that represents a likelihood that the agent will cross the roadway in the future time window after the current time point.

One or more of the following features can be included. From at least the crossing intent prediction and the crossing action prediction, a future trajectory for the autonomous vehicle after the current time point can be determined. Processing the input can include: (i) processing the scene features using an encoder neural network to generate an encoded representation of the scene features; (ii) processing the encoded representation of the scene features using one or more intent prediction neural network layers to generate the crossing intent prediction; and (iii) processing the encoded representation of the scene features using one or more crossing action prediction neural network layers to generate the crossing action prediction. Scene features can include different feature categories, and processing the scene features using the encoder neural network to generate the encoded representation can include: (i) for each feature category, processing the features of the feature category using an encoder subnetwork corresponding to the feature category to generate an encoded representation for the feature category; and (ii) combining the encoded representations for the feature category to generate the encoded representation of the scene features. The first machine learning model can further be configured to generate a cross-in-front prediction that includes a cross-in-front score that represents a likelihood that agent intends to cross in front of the autonomous vehicle in a future time window after the current time point. The scene features can include at least one of sensor data, roadgraph information and object track data. The machine learning model can execute in a single forward pass.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that makes predictions about agent behavior in the vicinity of a roadway, and can use the predictions when determining the behavior of an autonomous vehicle and recommendations provided by semi-autonomous vehicles. The term "vicinity," as used in this specification, refers to the area of the environment that is within the sensing range of one or more sensors of the autonomous vehicle. The predictions can include a crossing intent prediction and a crossing action prediction.

An agent is predicted to have a crossing intent if it is determined that the likelihood that the agent intends to cross a roadway within the vicinity of an autonomous vehicle, which can include semi-autonomous vehicles, within a specified period of time after the current time point satisfies a threshold. Even when an agent is predicted to have a crossing intent, the agent might not actually cross the roadway if the agent believes that there is no opportunity to cross within the specified period of time. For example, the agent might perceive and choose to yield to vehicle traffic, obey a crossing indicator that indicates the agent cannot legally cross, etc. When an agent is predicted to have crossing intent, the agent can either have a predicted crossing action, or a predicted yielding action, depending on the predicted behavior of the agent.

An agent is predicted to have a crossing action if it is determined that the likelihood the agent will move into a roadway within a specific period of time, e.g., within a few seconds of the current time, satisfies a threshold. Note that if an agent is not predicted to have crossing intent, then the crossing action is necessarily predicted to be non-crossing—that is, an agent will not cross without intending to cross. However, an agent can be accurately predicted to have both a crossing intent and not a crossing action, i.e., indicating that the agent likely would cross the roadway if opportunity arises but that no opportunity to cross is likely to arise.

A predicted crossing action can further be predicted to be crossing in front of or behind the autonomous vehicle, depending on whether there is an overlap between the predicted trajectory of the pedestrian and the trajectory of the autonomous vehicle. A pedestrian is considered as crossing in front of the vehicle if the pedestrian arrives at the overlap region earlier than the vehicle; otherwise, the pedestrian is considered to be crossing behind.

An agent is predicted to have a yielding action when it is determined that there is at least one other agent in the scene that can interact with the agent (e.g., a vehicle in the roadway), and it is further determined that the likelihood that an agent will move into a roadway within a specified period of time does not satisfy a threshold. Such a prediction can correspond to a prediction that the agent will stop, or sufficiently slow down, to yield to traffic near a road edge or on the roadway. Note that if there is no other agent in the scene, the agent still might not cross the roadway, but since no other agent is present, the agent would not be yielding to another agent, so the action is not yielding.

Figure 1A:
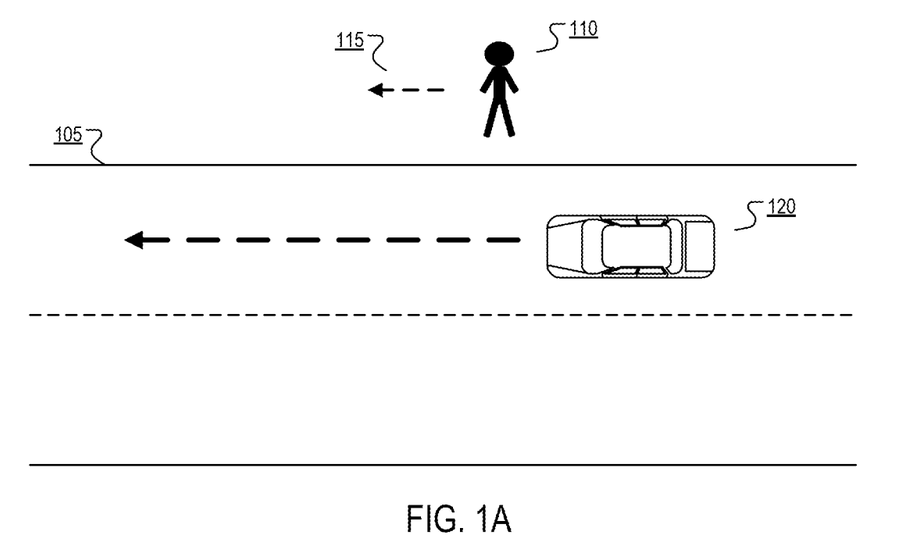
FIGS. 1A-1C illustrate an agent in the vicinity of a roadway.

FIG. 1A illustrates an agent 110 in the vicinity of a roadway 105 and an autonomous vehicle 120 is approaching. In this illustration, the agent 110 is traveling parallel to the roadway 105 as illustrated by the dashed line 115. Based on factors including the agent's 110 direction of travel 115 relative to the roadway 105, the system can produce a prediction, e.g., using a machine learning model, that the agent does not have crossing intent.

Figure 1B:
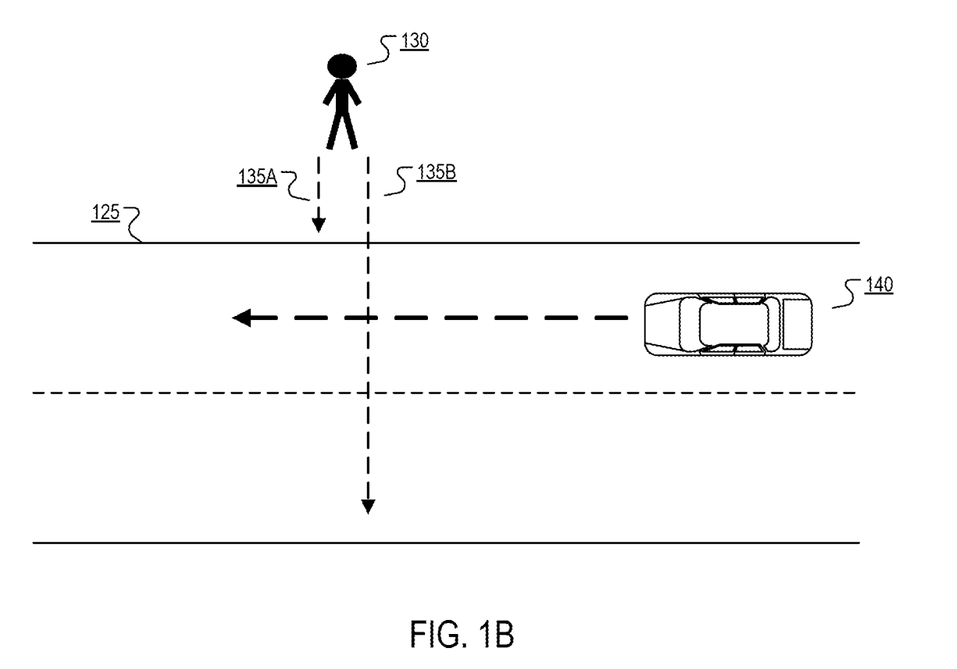

FIG. 1B illustrates an agent 130 in the vicinity of a roadway 125 and an autonomous vehicle 140 is approaching. In this illustration, the agent 130 is traveling toward the roadway 125 as illustrated by the two dashed lines 135A, 135B. The left dashed line 135A terminates at the edge of the roadway 125, illustrating that while the agent might have predicted crossing intent, the predicted crossing action is yielding. In such cases, the autonomous vehicle 140 can continue along its current path, or, if it determines that a courteous driver is likely to yield in this situation, the vehicle 140 can perform a breaking action to enable the agent to cross, or, for a semi-autonomous vehicle, provide an alert to the human driver of the vehicle 140 suggesting the driver yield.

In contrast, the right dashed line 135B extends into the roadway 125, illustrating both that the agent has predicted crossing intent and that the predicted crossing action is crossing. In this case, the autonomous vehicle 140 can take an action such as braking to avoid interacting with the agent 130, or for a semi-autonomous vehicle 140, provide an alert to the human driver of the vehicle 140 that braking is recommended.

Figure 1C:
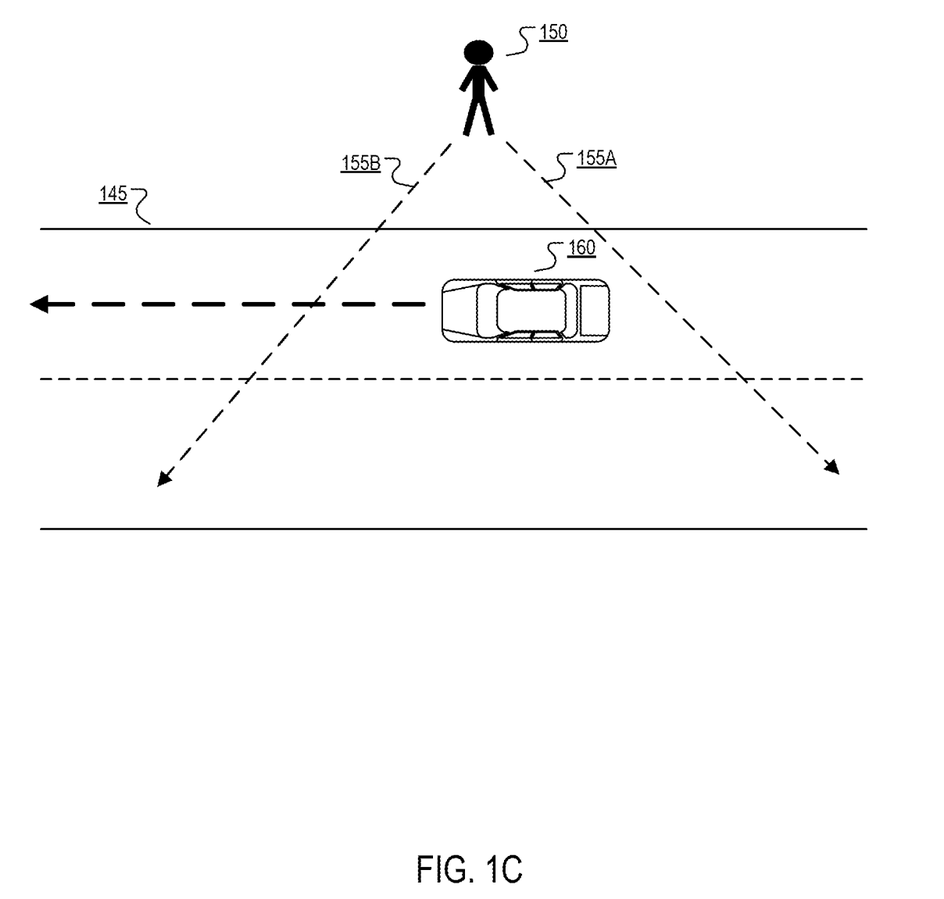

FIG. 1C illustrates an agent 150 in the vicinity of a roadway 145 and an autonomous vehicle 160 is approaching. In this illustration, the agent 150 is traveling toward the roadway 145 as illustrated by the two dashed lines 155A, 155B, both of which indicate a predicted crossing intent and a predicted crossing action of crossing. The right dashed line 155A passed behind the autonomous vehicle 160, illustrating that while the agent has predicted crossing intent and the predicted crossing action, the agent is predicted to cross behind the autonomous vehicle 160. In this case, the autonomous vehicle 160 might require no action to avoid an interaction with the agent 150.

In contrast, the right dashed line 155B extends into the roadway 145 and in front of the autonomous vehicle 160, illustrating that the agent has both predicted crossing intent and the predicted crossing action is crossing, and that the agent 150 is predicted to cross in front of the autonomous vehicle 160. In this case, the autonomous vehicle 160 can take an action such as braking to avoid interacting with the agent 150 or provide an alert to the driver recommending that the driver apply the brakes.

Figure 2:
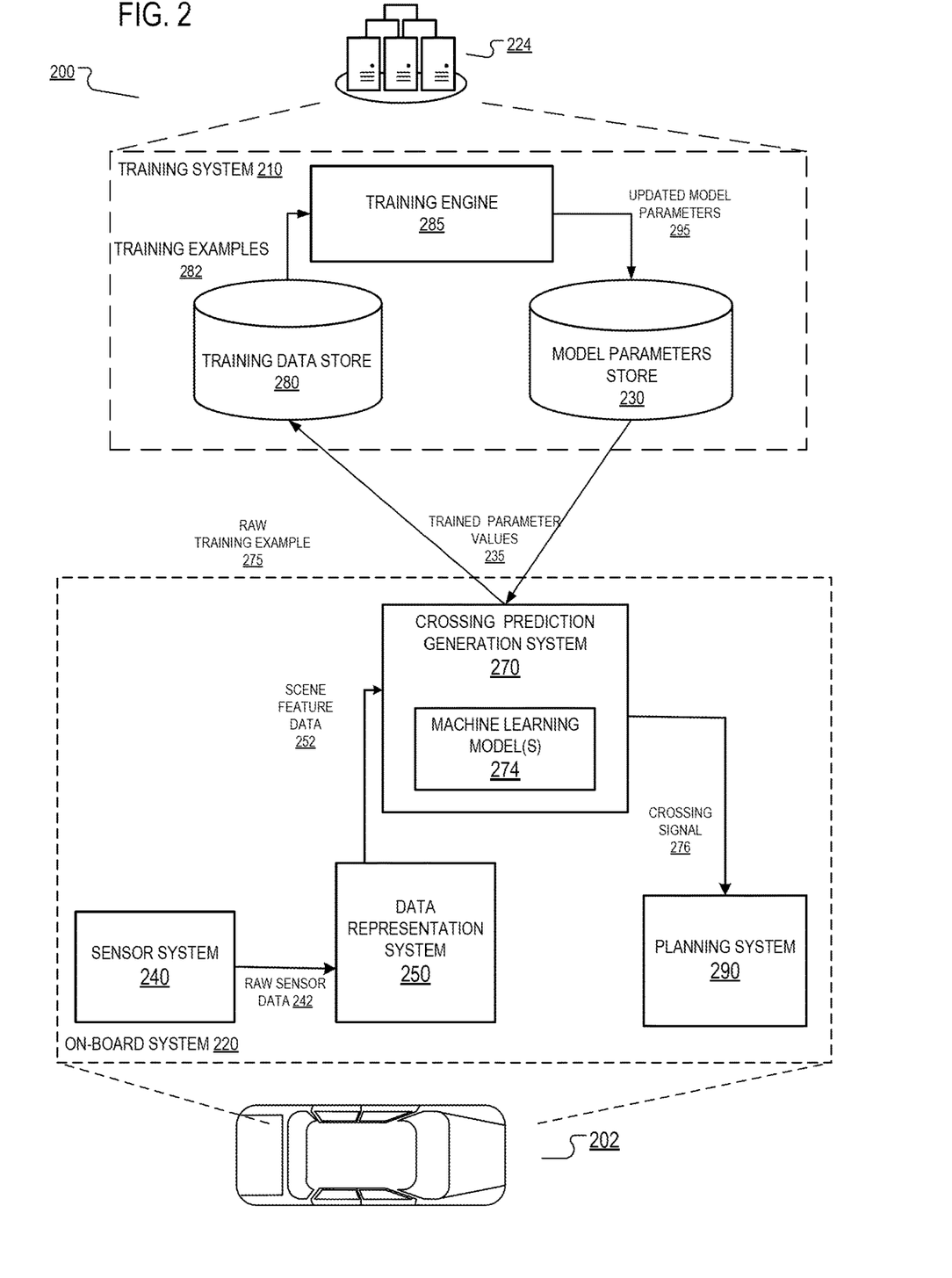
FIG. 2 is a diagram of an example system for determining yield behavior.

FIG. 2 is a diagram of an example system 200 for determining yield behavior in response to predicted crossing intent and predicted crossing action for an autonomous vehicle in the vicinity of an agent. The system 200 can include an on-board system 220 and a training system 210.

The on-board system 220 is physically located on-board a vehicle 202. Being on-board the vehicle 202 means that the on-board system 220 includes components that travel along with the vehicle 202, e.g., power supplies, computing hardware, and sensors. In some cases, the vehicle 202 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 202 can autonomously apply the brakes if a prediction indicates that a human driver is about to collide with another vehicle. As another example, the vehicle 202 can have an advanced driver assistance system (ADAS) that assists a human driver of the vehicle 202 in driving the vehicle 202 by detecting potentially unsafe situations and alerting the human driver or otherwise responding to the unsafe situation. As a particular example, the vehicle 202 can alert the driver of the vehicle 202 or take an autonomous driving action when an obstacle is detected, when the vehicle departs from a driving lane, or when an object is detected in a blind spot of the human driver. In another example, in response to determining that another agent might interact with the vehicle 202, the on-board system 220 may autonomously apply the brakes of the vehicle 202 or otherwise autonomously change the trajectory of the vehicle 202 to prevent an unwanted interaction between the vehicle 202 and the agent.

Although the vehicle 202 in FIG. 2 is depicted as an automobile, and the examples in this document are described with reference to automobiles, in general the vehicle 202 can be any kind of vehicle. For example, besides an automobile, the vehicle 202 can be another kind of autonomous vehicle that travels along a roadway, e.g., a truck or a motorcycle. Moreover, the on-board system 220 can include components additional to those depicted in FIG. 2 (e.g., a collision detection system or a navigation system).

To enable the safe control of the autonomous vehicle 202, the on-board system 220 includes a sensor system 240 which enables the on-board system 220 to "see" the environment in the vicinity of the vehicle 202. More specifically, the sensor system 240 includes one or more sensors, some of which are configured to receive reflections of electromagnetic radiation from the environment in the vicinity of the vehicle 202. For example, the sensor system 240 can include one or more laser sensors (e.g., LIDAR laser sensors) that are configured to detect reflections of laser light. As another example, the sensor system 240 can include one or more radar sensors that are configured to detect reflections of radio waves. As another example, the sensor system 240 can include one or more camera sensors that are configured to detect reflections of visible light.

The sensor system 240 continually (i.e., at each of multiple time points) captures raw sensor data which can indicate the directions, intensities, and distances traveled by reflected radiation. For example, a sensor in the sensor system 240 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 240 can also include a combination of components that receive reflections of electromagnetic radiation, e.g., lidar systems that detect reflections of laser light, radar systems that detect reflections of radio waves, and camera systems that detect reflections of visible light.

The sensor subsystems 240 or other components of the vehicle 202 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 240 classify one or more groups of raw sensor measurements as being measures of respective other agents, the sensor subsystems 240 can compile the raw sensor measurements into a set of raw data 242, and send the raw data 242 to a data representation system 250.

The data representation system 250, also on-board the vehicle 202, receives the raw sensor data 242 from the sensor system 240 and additional data that characterizes the environment, i.e., roadway information that can include roadgraph data that identifies lanes and marked crossing zones within roadways in the environment and generates scene feature data 252 that includes features that characterize the agents and environment in the vicinity of the vehicle 202. The scene feature data 252 can include a broad range of data such as the type of agent (motor vehicle, pedestrian, cyclist, etc.), the agent's location, speed, trajectory, and so on.

In some implementations, the on-board system can augment the data available from the sensor system 240 by accessing data available in data repositories stored within the autonomous vehicle 202, or data repositories outside of, but coupled to, the autonomous vehicle, such as in a data center with the data available made to the autonomous vehicle over a cellular or other wireless network.

The data representation system 250 can provide the scene feature data 252 to a crossing prediction generation system 270. The crossing prediction generation system 270 can process input derived from the features using one or more machine learning models 274. The machine learning models 274 can generate a crossing signal 276 for the agent that is in the vicinity of the autonomous vehicle 202. The crossing signal 276 can include (i) a crossing intent prediction that can include a crossing intent score that represents a likelihood that agent intends to cross a roadway in a future time window after the current time point, and (ii) a crossing action prediction that includes a crossing action score that represents a likelihood that the agent will cross the roadway in the future time window after the current time point. In some implementations, the crossing signal 276 also includes one or more relative crossing location predictions that include one or more relative crossing location scores that represents likelihoods that the agent intends to cross a roadway in front of and/or behind the autonomous vehicle in a future time window after the current time point, as described further below.

Figure 3:
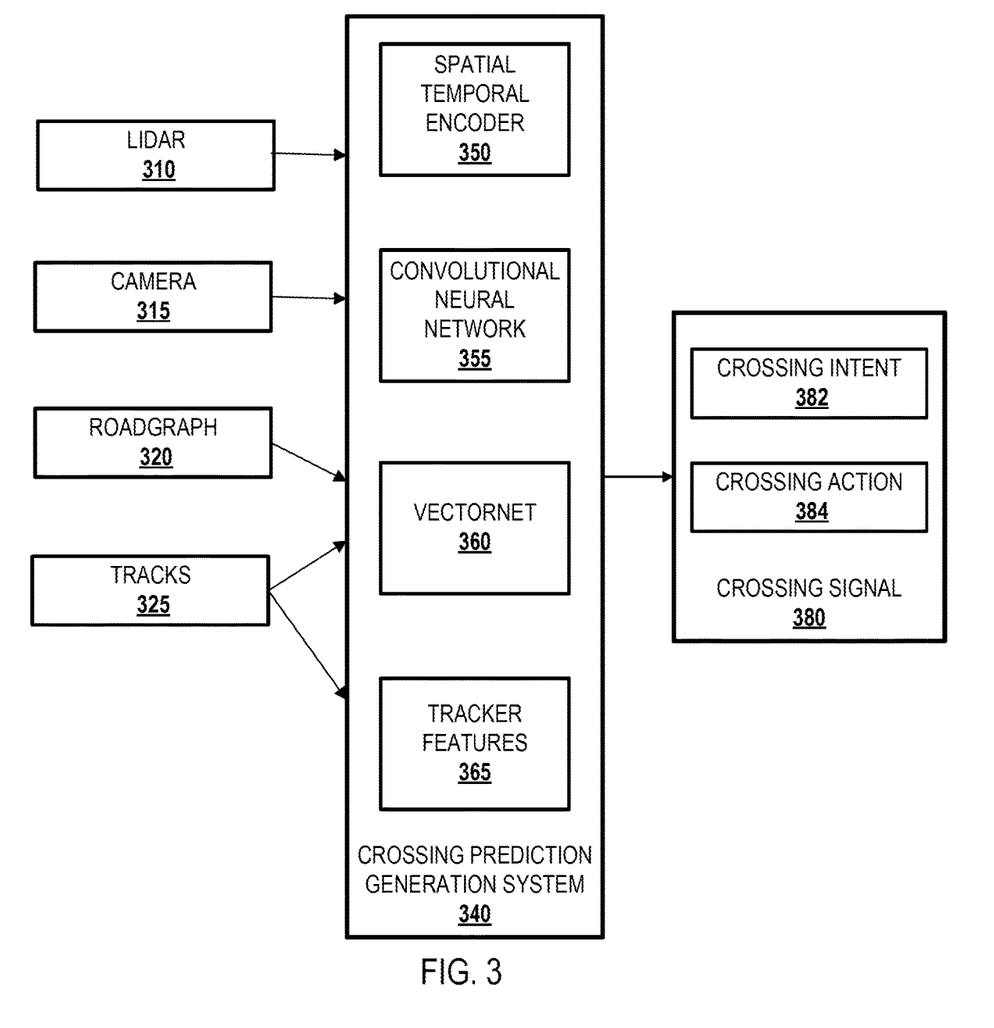
FIG. 3 illustrates an example crossing prediction generation system.

The one or more machine learning models 274 can be any appropriate type of machine learning model that can map a set of features to a crossing signal 276, as described further in reference to FIG. 3. Examples of features used by one or more machine learning models can include raw sensor data 242 and scene feature data 252, as described above.

FIG. 3 illustrates an example crossing prediction generation system 340. Generally, the crossing prediction generation system 340 is a neural network system that accepts feature data 310, 315, 320, 325 and produces a crossing signal 380. The feature data can include raw sensor data such as Lidar readings 310, e.g., the most recent 3 frames from Lidar data, and camera data 315, e.g., the 3 most recent images, along with scene feature data such as roadgraph information 320 and tracks data 325, which show the agent's path.

A description of VectorNet is available on Arxiv as "VectorNet: Encoding HD Maps and Agent Dynamics from Vectorized Representation," and a description of a CNN that can be used to encode camera patches is available on Arxiv as "Going Deeper with Convolutions." The spatial temporal encoder 350 can make use of a PointPillar (described on Arxiv as "PointPillars: Fast Encoders for Object Detection from Point Clouds" architecture to generate a respective Point Pillar representation for each of the Lidar frames and make use of a CNN to encode respective PointPillar representations for each of multiple Lidar frames.

In some implementations, the encoder neural network 350 can generate an encoded representation of the scene features. Optionally, for each feature category (i.e., sensor data, roadgraph information and track data), the crossing prediction generation system 340 can process the features using an encoder subnetwork corresponding to the feature category to generate, for the feature category, an encoded representation. The crossing prediction generation system 340 can then combine the encoded representations for the feature category to generate the encoded representation of the scene features. In addition, track features 365 can be determined from tracks 325, and can include properties of a track such as speed and curvature.

In the second stage, an intent/action predictor can combine, e.g., concatenate or combine using one or more fully-connected layers, appearance embeddings with track features 365 and roadgraph 320 data to generate a combined representation of the scene and process the combined representation to generate a crossing signal 380 that can include predictions for crossing intent 382 and crossing action 384. The intent/action predictor can be a multi-layer perceptron.

In some implementations, the system can produce at least a third score indicating a likelihood that the agent intends to cross in front of or behind the autonomous vehicle. In some implementations, the system can further produce scores reflecting additional agent behaviors such as loading or unloading vehicles, performing construction work, attending social gathering, etc. The system can include one or more neural networks that include a respective neural network head for each such behavior, and the training examples used to train the neural network can include labels (e.g., as assigned by human labelers) that indicate whether a training example includes these agent behaviors.

Returning to FIG. 2, the crossing signal 276 can be delivered to a planning system 290. The planning system 290 can use the crossing signal 276 to make fully-autonomous driving decisions, i.e., to update a planned trajectory for the vehicle 202. For example, the planning system 290 can generate a fully-autonomous plan to yield to a pedestrian if the crossing signal 276 for that pedestrian indicates that the agent has crossing intent, and the predicted crossing action is to cross. In this example, the planning system 290 can generate fully-autonomous control outputs to apply the brakes of the vehicle 202 causing the autonomous vehicle 202 to stop moving while the pedestrian crosses the roadway.

The fully-autonomous driving decisions generated by the planning system 290 can be implemented by a control system of the vehicle 202. For example, in response to receiving a fully-autonomous driving decision generated by the planning system 290 which indicates that the brakes of the vehicle should be applied, the control system may transmit an electronic signal to a braking control unit of the vehicle. In response to receiving the electronic signal, the braking control unit can mechanically apply the brakes of the vehicle. For semi-autonomous vehicles, in response to receiving driving recommendations generated by the planning system 290, the control system 202 can provide alerts and driving recommendations to the human driver of the vehicle, e.g., by displaying messages on a console or providing audible suggestions.

The training system 210, which is generally located remotely from the on-board system 220, e.g., in a data center remote from the autonomous vehicle, generates trained parameter values 235 for the one or more machine learning models 274.

The training system 210 includes a training data store 280 that stores the training data used to train each of the machine learning models 274. The training data store 280 receives raw training examples from vehicles operating in the real world. For example, the training data store 280 can receive a raw training example 275 from the vehicle 202 and one or more other agents that are in communication with the training system 210. Each raw training example 275 can be processed by the training system 210 to generate a new training example used to train one or more machine learning models 274.

The raw training examples 275 can include a model input for at least one machine learning model 274. The raw training examples 275 can also include outcome data characterizing the behavior of an agent. For example, the raw training examples 275 can include outcome data characterizing the intent of the given agent, which can include whether the agent crossed the roadway.

The machine learning model 274 can be trained using training examples 275 obtained from driving logs of vehicles, operated either by human drivers or autonomously. The crossing action in each example can be labeled as true or false according to the agent's actual behavior in the training example. The crossing intent can be labeled as true or false based either on heuristics or by a labeler based on the agent's actual behavior within some configured period. For example, if an agent does not immediately cross a roadway, but crossed at a time determined by a labeler to be the first safe opportunity to cross, the crossing intent can be labeled as true. (As noted previously, if the crossing intent is false, the crossing action must also be false.)

In implementations that include predictions related to the intent to cross in front of or behind an autonomous vehicle, such behavior in each example can be labeled according to the agent's actual behavior in the training example. In implementations that further include predictions related to the intent to cross behind an autonomous vehicle, such behavior in each example can be labeled according to the agent's actual behavior in the training example. For example, if the agent crosses behind an autonomous vehicle, but within a "comfort distance," the example can be, in various implementations, labeled as being in front of the autonomous vehicle or behind the autonomous vehicle, but within the comfort distance. Examples of comfort distances can be, for example, 2 feet, 3 feet, half a car length, a car length, and so on.

The training data store 280 can provide training examples 282 to a training engine 285, also housed in the training system 210. The training engine 285 uses the training examples 285 to update the model parameters of the machine learning model 274, and to provide the updated model parameters 295 to the model parameters store 230. Once the parameter values of the model 274 have been fully trained, the training system 210 can send the trained parameter values 235 to the on-board system 220, e.g., through a wired or wireless connection.

The training system 210 is typically hosted within a data center 224, which can be a distributed computing system having hundreds or thousands of computers in one or more locations.

Figure 4:
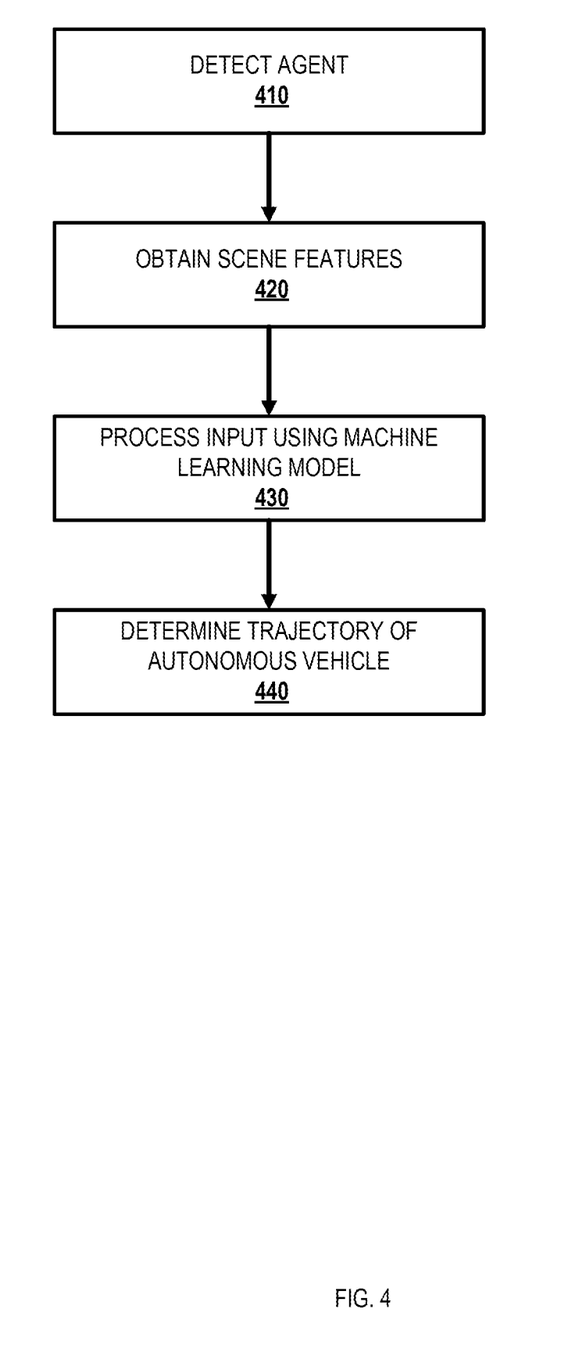
FIG. 4 is a flow diagram of an example process for determining yield behavior.

FIG. 4 is a flow diagram of an example process for determining yield behavior. For convenience, the process 400 will be described as being performed by a system for determining yield behavior, e.g., the system for determining yield behavior of FIG. 2, appropriately programmed to perform the process.

The system can detect an agent (410) that is a candidate to cross a roadway using conventional agent detection techniques applied to the sensor data obtained by the autonomous vehicle. For example, a pedestrian or a bicyclist can be candidates to cross a roadway, but automobiles are not.

The system obtains scene features (420). As described above, scene feature data can be obtained from sensors on the autonomous vehicle, other sensors in the environment and from one or more external data stores.

The system can process (430) an input containing the scene features using one or more machine learning models that are configured to generate: (i) a crossing intent prediction that can include a crossing intent score that represents a likelihood that the agent intends to cross a roadway in a first future time window after the current time point, and (ii) a crossing action prediction that includes a crossing action score that represents a likelihood that the agent will cross the roadway in a second future time window after the current time point. The predictions can be generated by a machine learning model that is configured to produce predictions, and the predictions can be generated in a single forward pass. That is, the machine learning model generates both of the predictions in parallel and by processing the same input. The first and second time windows can be the same, but are not required to be the same.

In addition, in some implementations, the system can predict the trajectory and destination of an agent, and use such predictions to predict the agent's intent to cross. In some implementations, a trajectory prediction output produced by the machine learning model can include a probability distribution over a space of possible trajectories and a predicted destination can be a predicted ending point on the other side of the roadway. Examples of models that generate probability distributions include the models described in *Identifying Driver Interactions via Conditional Behavior Prediction*, available at arXiv:2104.09959 and *MultiPath: Multiple Probabilistic Anchor Trajectory Hypotheses for Behavior Prediction*, available at arXiv:2104.05449. Such models can be included in the crossing prediction generation system.

The crossing intent trajectory and destination can also be predicted using a machine learning model. In some implementations, a crossing intent trajectory prediction output is produced by a machine learning model, and can include a probability distribution over a space of possible crossing intent trajectories. A predicted crossing intent destination can be a predicted ending point on the other side of the roadway. Since intent can reflect a longer period of time (e.g., several seconds to a minute or more), data used for training and prediction can reflect observation periods of similar duration.

In addition, the system can use the trajectory prediction to determine which other agents (e.g., automobiles or trucks) in the scene, if any, the pedestrian is predicted to cross in front of or behind.

If the score indicating the likelihood that the agent intends to cross satisfies a configured threshold, the agent can be predicted to have crossing intent. In cases where the machine learning model produces a probability distribution over a space of possible trajectories, the agent can be predicted to have crossing intent if the sum of the probabilities of trajectories that cross the roadway satisfies a configured threshold.

If the agent is predicted to have crossing intent and the score indicating the likelihood that the agent will perform a crossing action satisfies a configured threshold (which need not be the same threshold), the agent is predicted to perform a crossing action. If the agent is predicted to have crossing intent and the score indicating the likelihood that the agent will perform a crossing action does not satisfy the threshold, the agent is predicted to yield. The threshold can be received as input by the system. For example, the system can provide an application programming interface (API) that enables authorized administrators to provide a threshold value.

If the agent is predicted to perform a crossing action, in implementations where the system provides a score indicating a likelihood that the agent intends to cross in front of the autonomous vehicle, if that score satisfies a threshold, the agent is predicted to intend to cross in front of the autonomous vehicle; if the score does not satisfy the threshold, the agent is predicted to intend to cross behind the autonomous vehicle. In some implementations, the system can determine whether the agent intends to cross in front of or behind the autonomous vehicle using pairwise trajectory predictions of the agent and of the autonomous vehicle.

The model can receive as input features of a scene being traversed by an autonomous vehicle. The scene features can include sensor data, roadgraph information and track data. As described above, sensor data can include data obtained from one or more sensors present on or coupled to an autonomous vehicle, such as LIDAR data (e.g., the three most recent LIDAR readings) from a LIDAR sensor and camera images. Roadgraph information can be obtained from sources such as digital maps and sensors of the autonomous vehicle, and can be encoded as a set of polylines representing the roadway. Track data can include, for each agent in the scene, the agent's location, distance from the roadway, speed, acceleration, heading, etc. in the past few frames.

In some implementations, the system can modify (440) the trajectory of the autonomous vehicle. The system can determine the trajectory based at least in part on the crossing intent prediction and the crossing action prediction. The trajectory can be computed to ensure that the autonomous vehicle does not cross within a configured distance of the projected path of the agent, for example, by slowing down or temporarily stopping to yield to the pedestrian. For semi-autonomous vehicles, indications of the trajectory can be provided to the human driver. For example, the vehicle can provide an alert (such as a visual indicator on the vehicle's console) to the driver when a trajectory adjustment is recommended.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   identifying an agent that is in a vicinity of an autonomous vehicle navigating through an scene at a current time point;
   obtaining scene features of the scene, the scene features comprising features of (i) the agent and (ii) the autonomous vehicle;
   processing the scene features to generate a combined representation of the scene;
   processing the combined representation using a first machine learning model that is configured to generate a crossing signal that comprises both (i) a crossing intent prediction for the agent that comprises a crossing intent score that represents a likelihood that the agent intends to cross a roadway in a future time window after the current time point, and (ii) a crossing action prediction for the agent that comprises a crossing action score that represents a likelihood that the agent will cross the roadway in the future time window after the current time point;
   determining, from the crossing intent score, that the agent has an intent to cross the roadway in the future time window after the current time point;
   determining, from the crossing action score, that the agent has a predicted crossing action of yielding for the future time window after the current time point;
   determining whether the autonomous vehicle should yield to the agent based on (i) determining that the agent has an intent to cross the roadway in the future time window after the current time point and (ii) determining that the agent has a predicted crossing action of yielding for the future time window after the current time point; and
   controlling the autonomous vehicle based on the determination.

2. The method of claim 1, wherein controlling the autonomous vehicle based on the determination further comprises:
   determining, from at least (i) determining that the agent has an intent to cross the roadway in the future time window after the current time point and (ii) determining that the agent has a predicted crossing action of yielding for the future time window after the current time point, a future trajectory for the autonomous vehicle after the current time point.

3. The method of claim 1, wherein processing the scene features comprises:
   processing the scene features using an encoder neural network to generate an encoded representation of the scene features;
   processing the encoded representation of the scene features using one or more intent prediction neural network layers to generate the crossing intent prediction; and
   processing the encoded representation of the scene features using one or more crossing action prediction neural network layers to generate the crossing action prediction.

4. The method of claim 3, wherein the scene features include a plurality of different feature categories, and wherein processing the scene features using the encoder neural network to generate the encoded representation comprises:
   for each feature category, processing the features of the feature category using an encoder subnetwork corresponding to the feature category to generate an encoded representation for the feature category; and
   combining the encoded representations for the feature category to generate the encoded representation of the scene features.

5. The method of claim 1 where the first machine learning model is further configured to generate a cross-in-front prediction that comprises a cross-in-front score that represents a likelihood that agent intends to cross in front of the autonomous vehicle in a future time window after the current time point.

6. The method of claim 1 where the scene features comprise at least one of sensor data, roadgraph information and object track data.

7. The method of claim 1 where the machine learning model executes in a single forward pass.

8. The method of claim 1, wherein determining, from the crossing intent score, that the agent has an intent to cross the roadway in the future time window after current time point comprises determining that the crossing intent score satisfies a first threshold, and wherein determining, from the crossing action score, that the agent has a predicted crossing action of yielding for the future time window after the current time point comprises determining that the crossing action score does not satisfy a second threshold.

9. A system comprising one or more computers and one or more storage devices storing instructions that when executed by the one or more computers cause the one or more computers to perform operations comprising:
   identifying an agent that is in a vicinity of an autonomous vehicle navigating through an scene at a current time point;
   obtaining scene features of the scene, the scene features comprising features of (i) the agent and (ii) the autonomous vehicle;
   processing the scene features to generate a combined representation of the scene;
   processing the combined representation using a first machine learning model that is configured to generate a crossing signal that comprises both (i) a crossing intent prediction for the agent that comprises a crossing intent score that represents a likelihood that the agent intends to cross a roadway in a future time window after the current time point, and (ii) a crossing action prediction for the agent that comprises a crossing action score that represents a likelihood that the agent will cross the roadway in the future time window after the current time point;
   determining, from the crossing intent score, that the agent has an intent to cross the roadway in the future time window after the current time point;
   determining, from the crossing action score, that the agent has a predicted crossing action of yielding for the future time window after the current time point;
   determining whether the autonomous vehicle should yield to the agent based on (i) determining that the agent has an intent to cross the roadway in the future time window after the current time point and (ii) determining that the agent has a predicted crossing action of yielding for the future time window after the current time point; and
   controlling the autonomous vehicle based on the determination.

10. The system of claim 9, wherein controlling the autonomous vehicle based on the determination further comprises:
   determining, from at least (i) determining that the agent has an intent to cross the roadway in the future time window after the current time point and (ii) determining that the agent has a predicted crossing action of yielding for the future time window after the current time point, a future trajectory for the autonomous vehicle after the current time point.

11. The system of claim 9, wherein processing the scene features comprises:
   processing the scene features using an encoder neural network to generate an encoded representation of the scene features;
   processing the encoded representation of the scene features using one or more intent prediction neural network layers to generate the crossing intent prediction; and
   processing the encoded representation of the scene features using one or more crossing action prediction neural network layers to generate the crossing action prediction.

12. The system of claim 11, wherein the scene features include a plurality of different feature categories, and wherein processing the scene features using the encoder neural network to generate the encoded representation comprises:
   for each feature category, processing the features of the feature category using an encoder subnetwork corresponding to the feature category to generate an encoded representation for the feature category; and
   combining the encoded representations for the feature category to generate the encoded representation of the scene features.

13. The system of claim 9 where the first machine learning model is further configured to generate a cross-in-front prediction that comprises a cross-in-front score that represents a likelihood that agent intends to cross in front of the autonomous vehicle in a future time window after the current time point.

14. The system of claim 9 where the scene features comprise at least one of sensor data, roadgraph information and object track data.

15. The system of claim 9 where the machine learning model executes in a single forward pass.

16. One or more non-transitory computer-readable storage media storing instructions that when executed by one or more computers cause the one or more computers to perform operations comprising:
   identifying an agent that is in a vicinity of an autonomous vehicle navigating through an scene at a current time point;
   obtaining scene features of the scene, the scene features comprising features of (i) the agent and (ii) the autonomous vehicle;
   processing the scene features to generate a combined representation of the scene;
   processing the combined representation using a first machine learning model that is configured to generate a crossing signal that comprises both (i) a crossing intent prediction for the agent that comprises a crossing intent score that represents a likelihood that the agent intends to cross a roadway in a future time window after the current time point, and (ii) a crossing action prediction for the agent that comprises a crossing action score that represents a likelihood that the agent will cross the roadway in the future time window after the current time point;
   determining, from the crossing intent score, that the agent has an intent to cross the roadway in the future time window after the current time point;
   determining, from the crossing action score, that the agent has a predicted crossing action of yielding for the future time window after the current time point;
   determining whether the autonomous vehicle should yield to the agent based on (i) determining that the agent has an intent to cross the roadway in the future time window after the current time point and (ii) determining that the agent has a predicted crossing action of yielding for the future time window after the current time point; and
   controlling the autonomous vehicle based on the determination.

17. The one or more non-transitory computer-readable storage media of claim 16, wherein controlling the autonomous vehicle based on the determination further comprises:
   determining, from at least (i) determining that the agent has an intent to cross the roadway in the future time window after the current time point and (ii) determining that the agent has a predicted crossing action of yielding for the future time window after the current time point, a future trajectory for the autonomous vehicle after the current time point.

18. The one or more non-transitory computer-readable storage media of claim 16, wherein processing the scene features comprises:
processing the scene features using an encoder neural network to generate an encoded representation of the scene features;
processing the encoded representation of the scene features using one or more intent prediction neural network layers to generate the crossing intent prediction; and
processing the encoded representation of the scene features using one or more crossing action prediction neural network layers to generate the crossing action prediction.

19. The one or more non-transitory computer-readable storage media of claim 18, wherein the scene features include a plurality of different feature categories, and wherein processing the scene features using the encoder neural network to generate the encoded representation comprises:
for each feature category, processing the features of the feature category using an encoder subnetwork corresponding to the feature category to generate an encoded representation for the feature category; and
combining the encoded representations for the feature category to generate the encoded representation of the scene features.

20. The one or more non-transitory computer-readable storage media of claim 18, where the first machine learning model is further configured to generate a cross-in-front prediction that comprises a cross-in-front score that represents a likelihood that agent intends to cross in front of the autonomous vehicle in a future time window after the current time point.

21. The one or more non-transitory computer-readable storage media of claim 16 where the scene features comprise at least one of sensor data, roadgraph information and object track data.

* * * * *